United States Patent [19]

Lochhead et al.

[11] Patent Number: 4,668,731

[45] Date of Patent: May 26, 1987

[54] STABLE CARBOXYLIC ACID POLYMERS IN MINERAL SPIRITS

[75] Inventors: Robert Y. Lochhead, Avon Lake; Thomas R. George, Jr., Wooster; William L. Banks, Chagrin Falls, all of Ohio

[73] Assignee: The B. F. Goodrich Company, Akron, Ohio

[21] Appl. No.: 762,176

[22] Filed: Aug. 5, 1985

[51] Int. Cl.$^4$ .................................................. C08K 5/01
[52] U.S. Cl. ................................... 524/474; 524/502; 524/506; 524/519; 524/520; 524/522; 525/213; 525/217; 525/221
[58] Field of Search ............... 524/474, 506, 502, 519, 524/520, 522; 525/213, 217, 221

[56] References Cited

U.S. PATENT DOCUMENTS

| | | | |
|---|---|---|---|
| 2,479,410 | 8/1949 | Rothrock et al. | 524/313 |
| 3,068,183 | 12/1962 | Strolle | 524/310 |
| 3,196,121 | 7/1965 | McKay et al. | 524/313 |
| 3,875,091 | 4/1975 | Tsugukuni et al. | 524/313 |
| 4,200,561 | 4/1980 | Chang | 524/313 |
| 4,420,596 | 12/1983 | Lochhead et al. | 526/212 |
| 4,420,610 | 12/1983 | Sehm | 524/490 |
| 4,536,528 | 8/1985 | George, Jr. et al. | 524/313 |

FOREIGN PATENT DOCUMENTS

| | | | |
|---|---|---|---|
| 0247092 | 5/1960 | Australia | 524/474 |
| 0635683 | 1/1962 | Canada | 524/474 |
| 0934038 | 8/1963 | United Kingdom | 524/474 |
| 1009004 | 11/1965 | United Kingdom | 524/474 |
| 1019361 | 2/1966 | United Kingdom | 524/474 |

*Primary Examiner*—Joseph L. Schofer
*Assistant Examiner*—T. M. Reddick
*Attorney, Agent, or Firm*—George A. Kap; Alan A. Csontos

[57] ABSTRACT

Dispersion of polyacrylic acid in mineral spirits containing an elastomer that is swellable in mineral spirits, amount of elastomer being sufficient to render the dispersion less resistant to settling of solids.

6 Claims, No Drawings

4,668,731

STABLE CARBOXYLIC ACID POLYMERS IN MINERAL SPIRITS

BACKGROUND OF THE INVENTION

Homopolymers and copolymers of unsaturated carboxylic acids are useful thickening agents. Such polymers can be cross-linked with a small amount of a known cross-linking agent for efficient thickening. One class of such polymers are prepared by polymerization of the acid in the presence of a free radical catalyst in mineral spirits forming a mineral spirits dispersion of the polymer.

The carboxylic acid polymers dispersed in mineral spirits have many applications such as in print-pastes and construction adhesives, however, upon storage or transportation in a container over long distances, the dispersed polymer tends to settle to the lower portion of the container and is often very difficult to redisperse. Mineral spirit dispersions of such polymers that are readily redispersible by shaking or simple stirring, even after long periods of storage or transportation over long distances, are desired.

The patent application of K. E. Burnfield, entitled "Stabilization of Mineral Spirit Dispersions of Carboxyl-Containing Polymers", filed Oct. 24, 1983 and bearing Ser. No. 544342, now abandoned, discloses stabilization of the carboxyl containing polymers in mineral spirits by the addition of a glyceryl tris-12-hydroxystearate and/or mixed saturated $C_{18-36}$ fatty acid triglycerides. Such dispersions were thought to be stable, however, it was discovered that when these dispersions were transported in 55-gallon drums, the solids settled as a hard cake that was very difficult to redisperse.

Another patent application in this area is one entitled "Stable Mineral Spirit Dispersions of Carboxyl-Containing Polymers" filed Jul. 9, 1984 and bearing Ser. No. 629,040 now U.S. Pat. No. 4,536,528. This application discloses mineral spirit dispersions of carboxylic acid polymers which are rendered more stable by addition thereto of a block copolymer of propylene oxide and ethylene oxide, and glyceryl tris-12-hydroxystearate and/or mixed saturated $C_{18-36}$ fatty acid triglycerides. The block copolymers are of propylene oxide and ethylene oxide having molecular weight of in the range of about 1,000 to 20,000 and containing about 10 to 80% by weight of polyoxyethylene units. Inventors in that application are Messrs. George and Lochhead.

SUMMARY OF THE DISCLOSURE

The subject of this invention is dispersions of carboxylic acid polymers in mineral spirits wherein the tendency of the polymer to settle is reduced and which are rendered readily redispersible with minimal agitation. Such dispersions are obtained by admixing therein a sufficient amount of an elastomer which is swellable in mineral spirits.

DETAILED DESCRIPTION OF THE INVENTION

This invention is directed to stable or readily redispersible dispersions or slurries of carboxylic acid polymers in mineral spirits containing a sufficient amount of an elastomer of at least one olefin or a diene, the elastomer being swellable or dissolvable in mineral spirits. The elastomer must be swellable to a substantial degree since slight swellability in mineral spirits does not render the elastomer useful as a suspending agent. For purposes herein, swelling of an elastomer particle should be at least ten times its original diameter in the mineral spirits dispersion.

The system described herein yields essentially non-settling, easily redispersible dispersions of carboxylic acid polymers. In one particular case, however, there was evidence of about one inch of a soft, easily redispersible polymer on the bottom of a 55-gallon drum of the dispersion after transport over a considerable distance although it was verified that the solids content of the polymer was virtually identical from bottom to top of the drum.

Preparation of the carboxylic acid polymer dispersions is accomplished by polymerization of one or more carboxyl-containing monomers, optionally with other vinylidene comonomers, in mineral spirits in the presence of a free radical catalyst in a closed vessel in an inert atmosphere under autogenous pressure or artifically-induced pressure, or in an open vessel in an inert atmosphere at atmospheric pressure. Temperature of the polymerization may be varied from about 0° to 125° C. or lower or higher. Polymerization at 25° C. to 90° C. using a free radical catalyst is generally effective in producing polymer yields of 75% to 100%. The monomer may be batch charged or continuously added during the course of polymerization or by any other manner of polymerization techniques conventionally used. Normal polymerization time is about 3 to 12 hours.

Typical free radical forming catalysts include peroxygen compounds such as caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium (2-ethlhexyl)percarbonate, and the like, as well as azo catalysts such as azodiisobutyryl nitrile. Other catalysts utilizable are the so-called "redox" type of catalyst and the heavy-metal activated catalyst systems. Ultraviolet light may also be used as a source of free radicals. Some systems polymerize solely by heat, but catalysts provide better control. Amount of such catalysts normally is on the order of 0.01 to 1 weight percent, based on total polymerization mixture.

The mineral spirits used as the polymerization media is a clear, combustible, petroleum liquid product normally containing a major proportion of liquid aliphatic hydrocarbon materials. The specific gravity normally ranges from about 0.75 to about 0.81, with a boiling range from about 150° C. to about 220° C. While the flash point is normally above about 40° C., for safety reasons, the flash point should be above about 60° C. A material having a composition of 0 to less than 5% aromatics, about 40 to about 80% paraffins and about 15 to 60% naphtha, having a flash point about 60° C., produces good results.

The amount of mineral spirits used normally will be in excess of the monomers to be polymerized. While the proportion may vary from at least 1 weight percent of monomer and 99 weight percent mineral spirits up to about 60 weight percent monomers and 40 weight percent mineral spirits, more normally, a concentration of about 25 to about 50 weight percent monomers is employed to obtain high solids content dispersions.

In the practice of the invention, the polymerizations may be either batch, semi-batch, or continuous. The agitation may be any agitation sufficient to maintain the slurry and obtain effective heat transfer including, for example, helical agitation, pitched turbines and the like.

The carboxylic acid polymers are prepared from vinylidene monomers containing at least one activated C═C group and a carboxyl group. Such polymers may be homopolymers of an unsaturated, polymerizable carboxylic acid monomer such as acrylic acid, methacrylic acid, maleic acid, itaconic acid and the like, or copolymers thereof. The carboxyl containing polymers, in the absence of a cross-linking agent, have weight average molecular weights greater than 500 to as high as several million, generally 1,000 to 2,000,000 and preferably greater than about 10,000 to about 1,000,000 or more. Of course, in the presence of a cross-linking agent, even higher molecular weights are achieved.

Typical polymers contemplated herein are those described in U.S. Pat. No. 2,798,053. Copolymers, for example, include copolymers of acrylic acid with small amounts of polyalkylenyl polyether cross-linkers that are gel-like polymers, which, especially in the form of their salts, absorb large quantities of water or solvents with subsequent substantial increase in volume. Other useful carboxyl-containing polymers are described in U.S. Pat. No. 3,940,351, directed to polymers of unsaturated carboxylic acid and at least one alkyl acrylic or methacrylic ester where the alkyl group contains 10 to 30 carbon atoms. Other types of such copolymers are described in U.S. Pat. No. 4,062,817 wherein the polymers described in 3,940,351 contain additionally another alkyl acrylic or methacrylic ester where the alkyl groups contain 1 to 8 carbon atoms. Carboxylic polymers and copolymers, such as those of acrylic acid and methacrylic acid, also may be cross-linked with polyfunctional materials such as divinyl benzene, unsaturated diesters and the like, as is disclosed in U.S. Pat. Nos. 2,340,110; 2,340,111; and 2,533,635.

More specifically, the carboxylic monomers useful in the production of polymers of this invention are the olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group, i.e., —C═C—COOH, or as parts of a terminal methylene grouping, CH$_2$═C<. Olefinically-unsaturated acids of this class include such materials as the acrylic acids typified by the acrylic acid itself, alpha-cyano acrylic acid, methyacrylic acid, alpha-phenyl acrylic acid, beta-acryloxy propionic acid, sorbic acid, maleic acid, and the like. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule.

The preferred carboxlic acid monomers are the monoolefinic acrylic acids and related monomers having the general structure

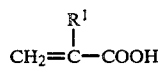

wherein R$^1$ is a substituent selected from the class consisting of hydrogen, halogens, and the cynaogen (—C≡N) group, monovalent alkyl radicals, monovalent aryl radicals, monovalent aralkyl radicals, monovalent alkaryl radicals and monovalent cycloaliphatic radicals. Of this class, acrylic and methacrylic acids are most preferred. Another useful carboxylic monomer is maleic anhydride or the acid.

The polymers contemplated include both homopolymers of carboxylic acids or anhydrides thereof and the defined carboxylic acids copolymerized with one or more other vinylidene monomers. Such comonomers include, for example, acrylate ester monomers including those acrylic acid ester monomers such as derivatives of an acrylic acid represented by the formula

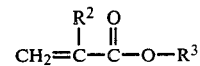

wherein R$^3$ is an alkyl group having from 1 to 30 carbon atoms, preferably 1 to 20 carbon atoms and R$^2$ is hydrogen, methyl or ethyl. Representative acrylates include methyl acrylate, ethyl acrylate, isopropyl acrylate, butyl acrylate, methyl methacrylate, ethyl methacrylate, octyl acrylate, octyl methacrylate, 2-ethylhexyl methacrylate, and the like; higher alkyl acrylic esters are decyl acrylate, lauryl acrylate, stearyl acrylate, and the corresponding methacrylates. Mixtures of two or three or more long chain acrylic esters may be successfully polymerized with one or more of the carboxylic acid monomers.

Other comonomers include unsaturated nitriles, including acrylic nitriles; unsaturated amides, particularly acrylic amides; alpha olefins of 2 to 12 carbon atoms; dienes of 4 to 10 carbon atoms; vinyl esters and allylesters; vinyl and alkyl ethers and ketones; vinyl aromatics, particularly styrene and derivatives thereof; chloroacrylates and cyanoalkyl acrylates; alkoxyacrylates; haloacrylates; vinyl halides; divinyls; diacrylates and other polyfunctional monomers; bis (beta-haloalkyl) alkenyl phosphonates; and the like.

The comonomers noted above are present in the copolymer in amount of 0.5 to 40, preferably 1 to 10 weight percent.

The polymers described herein can be crosslinked with any poly-functional vinylidene monomer containing at least two terminal CH$_2$═C groups, including for example, butadiene, isoprene, divinyl benzene, divinyl naphthalene, allyl acrylates and the like. Particularly useful crosslinking monomers for use in preparing the copolymers are polyalkenyl polyethers having more than one alkenyl ether group per molecule. Efficiency of the polyether crosslinking agent increases with the number of potentially polymerizable groups on the molecule. It is preferred to utilize polyethers containing an average of two or more alkenyl ether groupings per molecule.

Typical crosslinking agents are allyl pentaerythritol, allyl sucrose, trimethylolpropane triacrylate, 1,6-hexanediol diacrylate, trimethylolpropane diallyl ether, and the like. Allyl pentaerythritol, trimethylolpropane diallylether and allyl sucrose provide excellent polymers. When the crosslinking agent is present, the polymeric mixtures usually contain about 0.005 to 5% by weight of the crosslinking monomer, based on the total of carboxylic acid monomer, plus other monomers, if present, and more preferably about 0.01 to 2 weight percent.

The polymers described herein can be homopolymers or copolymers of one or more carboxylic acid monomers. Such copolymers can contain as little as about 60 weight percent of a carboxylic acid monomer. In a preferred embodiment, such copolymers, however, contain greater than 70 weight percent of a carboxylic acid monomer, preferably greater than 80 weight percent thereof, remainder being one or more of the comonomers.

The additives found useful in providing stable dispersions of carboxylic acid polymers in mineral spirits are elastomers which swell in mineral spirits. To be useful herein, an elastomer must swell in mineral spirits to a substantial degree since slight swelling will not produce the desired effect. It has been determined that more useful elastomers swell at least 15 times their original diameter.

It has been found that crosslinked elastomers do not swell in mineral spirits or do not swell sufficiently to render the elastomer useful herein. Therefore, it appears that crosslinked elastomers that do not swell sufficiently are not useful herein. Likewise, it was found that chlorinated elastomers did not have the desired swelling characteristics, and therefore, would not be useful herein. Carboxylated styrene-butadiene rubbers were also found to be not useful for purposes herein. Based on the foregoing, chemically crosslinked elastomers, chlorinated or halogenated elastomers, and carboxylated styrene-butadiene rubbers, appear to have limited utility, if any, for purposes herein.

More specifically, elastomers that are effective in preventing settling in the polymer dispersions described herein include natural rubber and synthetic rubber or elastomers. Natural rubber is a cis-polymer of isoprene. Synthetic elastomers include those prepared by polymerization of butadiene alone or with styrene; reaction of sodium polysulfides and dihalides; polymerization of isobutylene; polyolefins; polyurethanes; and others. More specifically, the synthetic elastomers include such polymers as styrene-butadiene, polyisobutylene, butyl rubber, neoprene, polysulfide rubber, acrylic elastomers, silicone rubber, fluorine-containing elastomers, chlorinated polyethylene, polyethylene-polypropylene rubber, and the like.

In the preparation of useful styrene-butadiene rubbers, the amount of butadiene exceeds that of styrene. Emulsifiers that are generally used in making these rubbers include fatty acid and rosin acid emulsifiers, with non-staining stabilizers and acid and salt acid coagulants. Crumb rubbers of styrene-butadiene are particularly useful. Ethylene-propylene rubbers are also similarly useful. Such rubbers contain about 40-70% polymerized ethylene. Butyl rubbers are copolymers of isobutylene with a small amount of a diolefin to make them vulcanizable whenever that is needed. Commercial butyl rubbers are, however, copolymers of isobutylene and isoprene. Neoprene generally denotes rubber-like polymers of chloroprene, i.e., 2-chloro-1,3-butadiene. The polysulfide elastomers are reaction products of ethylene dihalides and alkali sulfides. The polysulfide rubbers are believed to be linear condensation polymers.

By careful elimination of impurities, which lead to crosslinking or limited molecular weight, silicone polymers with linear chains have been produced with number average molecular weights in the millions. Such silicone polymers have elastomeric properties. Two fluorine-containing elastomers have been marketed. One is a copolymer of chlorotrifluoro-ethylene with another comonomer whereas the other elastomer is poly (perfluorobutyl) acrylate. Urethane rubbers can be prepared by condensing low molecular weight polyesters or polyethers with diisocyanates to give high molecular weight linear chains. When polyethylene is treated with chlorine, some chlorine atoms are substituted on the chains. The chlorination can be carried out either on the solid material or in solution. Results of these modifications are that the chlorine atoms break up the regularity of the polyethylene chain structure so that crystallization is no longer possible, thus imparting an elastomeric character to the polymer. A typical chlorinated polyethylene contains 25-35% chlorine.

Particularly preferred elastomers for purposes herein are styrene-butadiene rubbers, ethylene-propylene rubbers, and butyl rubbers. Such elastomers include linear and branched polymers but do not include molecularly crosslinked, halogenated or carboxylated polymers since such elastomers do not meet the test of swellability.

Amount of the stabilizing elastomer that is added to the polymer dispersion varies from about 0.1 to 10, preferably 0.5 to 5 weight percent, based on the weight of the total dispersion containing about 44% solids. In a less concentrated dispersion, it appears that more elastomer would be required to achieve the desired result. Although more of such elastomers can be used, it should be realized that a large amount thereof would set-up the dispersion or unduly increase its viscosity.

Stable dispersions described herein can be prepared by admixing suitable elastomers with the polymer dispersions described herein. This can be accomplished by adding the elastomer directly to the mineral spirits dispersion and mixing the dispersion until the elastomer is homogeneously dispersed throughout the dispersion. Addition of the elastomer can be made in a drum but in a preferred embodiment, the elastomer is admixed right after its preparation but before its storage in drums or other means. Mixing time, of course, will vary depending whether the elastomer is admixed in a drum or on-line.

The invention disclosed herein is illustrated below with respect to specific elastomers used to stabilize a mineral spirits dispersion containing 44% lightly crosslinked polyacrylic acid, with respect to settling.

EXAMPLE 1

This example demonstrates effectiveness of several elastomers for stabilizing polyacrylic acid solids in a mineral spirits dispersion. The dispersion was in 55-gallon drums to which an elastomer was added with mixing for a period of time until the elastomer was homogeneously distributed throughout the dispersion. This time period varied from drum to drum but was in the range of 1 to 4 hours at a temperature of 40° to 45° C. The drums contained a dispersion of 44% solids. Table I, below, shows the elastomers used and amount of each elastomer that was required to achieve stability against settling:

TABLE I

| Elastomer | Amt. Elastomer Required For Stability |
|---|---|
| SBR | 3% |
| Crosslinked SBR | Failed |
| Chlorinated SBR | Failed |
| Butyl Rubber | 3% |
| Ethylene Propylene Rubber A | 3% |
| Ethylene Propylene Rubber B | 4% |
| Ethylene Propylene | 4% |

TABLE I-continued

| Elastomer | Amt. Elastomer Required For Stability |
|---|---|
| Rubber C | |

In the above Table I, the SBR used was Ameripol 1012 SBR, containing 23.5% bound styrene with butadiene being the remainder, in polymerized form. Ameripol 1012 SBR was prepared with a fatty acid emulsifier, a nonstaining stabilizer, and Geltrol salt acid congulant. Typical raw Mooney viscosity of Ameripol 1012 is about 115. Crosslinked SBR in the above table was Ameripol 1009 SBR whereas the chlorinated SBR was Dow CPE 3611 SBR. Ethylene-propylene rubbers A,B, and C were Polysar 405, 585 and 345 polymers, with Polysar 585 and 345 polymers also containing a small amount of ethylene norbornene.

Results in Table I show that whereas styrene-butadiene rubber is effective in stabilizing against settling a mineral spirits dispersion containing 44% of a crosslinked polyacrylic acid, the crosslinked and chlorinated styrene-butadiene rubbers failed at all levels, and were ineffective. The several ethylene-propylene rubbers tried were shown to be effective even at moderate levels.

The stable dispersions in Table I were subjected to the temperature of $-10°$ C. and also to cycling between $-10°$ C. and ambient. The static test at $-10°$ C. was carried out for 6 months whereas the cycling test was conducted over 5 cycles. In both of these tests, the dispersions remained stable with respect to settling.

EXAMPLE 2

A steel drum of stabilized dispersion was tested for settling in a transportation test. The drum was a standard 55-gallon steel drum having a height of 36 inches. It was filled with a mineral spirits dispersion containing 44% of a crosslinked polyacrylic acid polymer. The dispersion also contained 3 weight percent of styrene-butadiene Ameripol 1012 rubber. This drum was shipped in a truck over a distance exceeding 1000 miles. This is believed to be a rigorous test for determining stability of the mineral spirits dispersions against settling of solids.

On completion of this transportation test, the dispersion in the drum did not show evidence of syneresis although there was about one inch of soft, easily dispersible cake on the bottom of the drum. Samples of the dispersion were taken from top and bottom of this drum and tested for the content of the polymer. This was done by measuring viscosity of a standard weight of product in a standard amount of water at pH of 7.0. This test showed that the polymer solids content was virtually identical at top and bottom of the drum.

Other more rigorous transportation tests were conducted which verified the conclusions made herein.

EXAMPLE 3

Several print-pastes were thickened with a 44% of a crosslinked polyacrylic acid mineral spirits dispersion stabilized with 3% of Ameripol 1012 styrene-butaliene rubber. Acceptable printing performance was achieved with the resulting pastes.

To assess whether the rubber would cause problems by precipitating in aqueous-based print-pastes and subsequently clogging screens or jets, the above print-pastes were passed through a 200-mesh screen. On passing through the screen, there was no evidence of rubber deposit on the screen, indicating that there would not be clogging of screens or jets due to rubber precipitation.

We claim:

1. A dispersion of polymer in mineral spirits comprising mineral spirits; a polymer suspended in mineral spirits, said polymer is selected from homopolymers and copolymers containing at least 60% by weight of a polymerized monomer having the general structure of

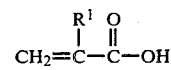

wherein $R^1$ is selected from hydrogen, halogens, cyanogen group, monovalent alkyl radicals, monovalent aryl radicals, monovalent aralkyl radicals, monovalent alkaryl radicals, and monovalent cycloaliphatic radicals; and an elastomer selected from natural rubber to synthetic rubber which is swellable in mineral spirits used in a sufficient amount to stabilize said polymer against settling in said mineral spirits.

2. Dispersion of claim 1 wherein said dispersion comprises 15 to 70% by weight of said polymer and wherein said polymer is composed of 70 to 100% by weight of said polymerized acrylic acid with remainder being one or more polymerized comonomers.

3. Dispersion of claim 2 wherein said acrylic acid is selected from acrylic acid itself, methacrylic acid, and mixtures thereof and wherein said comonomers are selected from acrylic acid esters having the general structure of

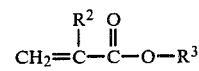

wherein $R^2$ is hydrogen, methyl or ethyl and wherein $R^3$ is an alkyl group of 1 to 20 carbon atoms.

4. Dispersion of claim 3 wherein said polymer is composed of greater than 80% by weight of said polymerized acid and wherein said elastomer is selected from polymers of butadiene and styrene, polyisobutylene, copolymers of isobutylene and isoprene, polychloroprene, polysulfide rubber, acrylic elastomers, silicone rubber, fluorine-containing elastomers, polyethylene elastomers, polypropylene elastomers, polyethylene polypropylene rubber, chlorinated polyethylene, and mixtures thereof, amount of said elastomer is 0.1 to 10% by weight based on the total weight of a 44% mineral spirits dispersion.

5. Dispersion of claim 3 wherein said polymer is composed of greater than 80% by weight of said polymerized acid and wherein said elastomer is selected from styrene-butadiene rubber, ethylene-propylene rubber, butyl rubber, and mixtures thereof, amount of said elastomer is 0.5 to 5% by weight, based on the total weight of a 44% mineral spirits dispersion.

6. Dispersion of claim 5 wherein said polymer contains less than 5% by weight of a crosslinking agent selected from allyl pentaerythritol, allyl sucrose, trimethylolpropane diallylether, and mixtures thereof.

* * * * *

UNITED STATES PATENT AND TRADEMARK OFFICE
CERTIFICATE OF CORRECTION

PATENT NO. : 4,668,731

DATED : May 26, 1987

INVENTOR(S) : Robert Y. Lochhead, et al.

It is certified that error appears in the above-identified patent and that said Letters Patent are hereby corrected as shown below:

Column 8, line 21, "to" should read --and--

Signed and Sealed this

Twenty-ninth Day of March, 1988

Attest:

DONALD J. QUIGG

Attesting Officer

Commissioner of Patents and Trademarks